Nov. 7, 1933.  H. G. METCALF ET AL  1,934,318
ANTISKID DEVICE
Filed April 18, 1932    2 Sheets-Sheet 1
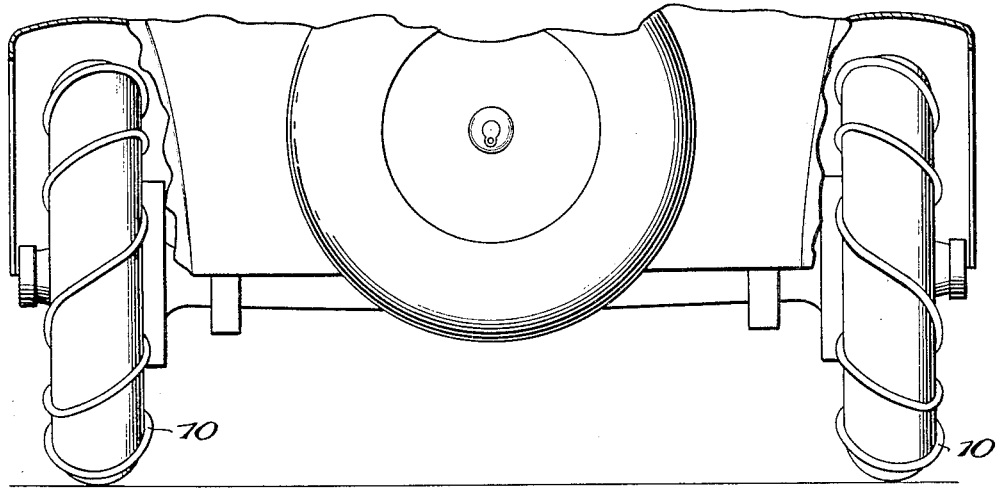
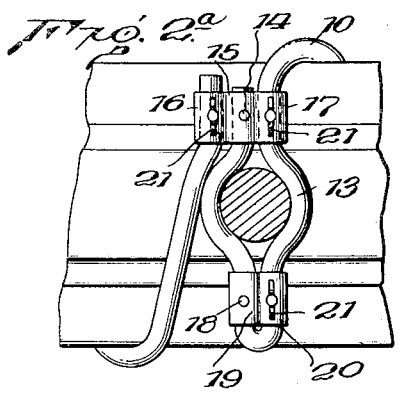
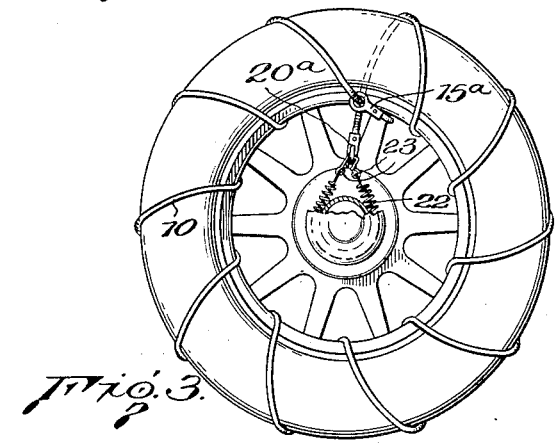
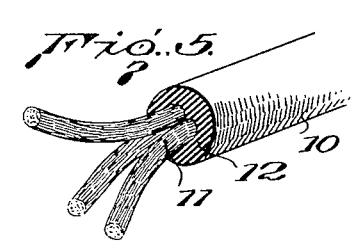
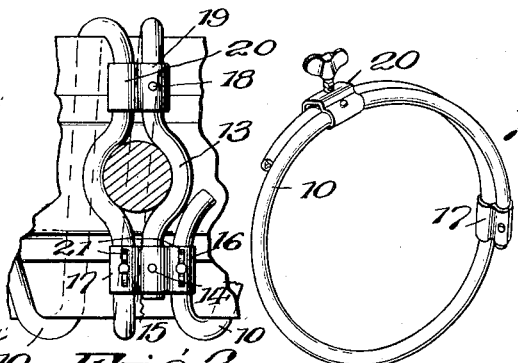
Inventors
Harold G. Metcalf
&
Kenneth H. Bower,
By Church & Church
Their Attorneys

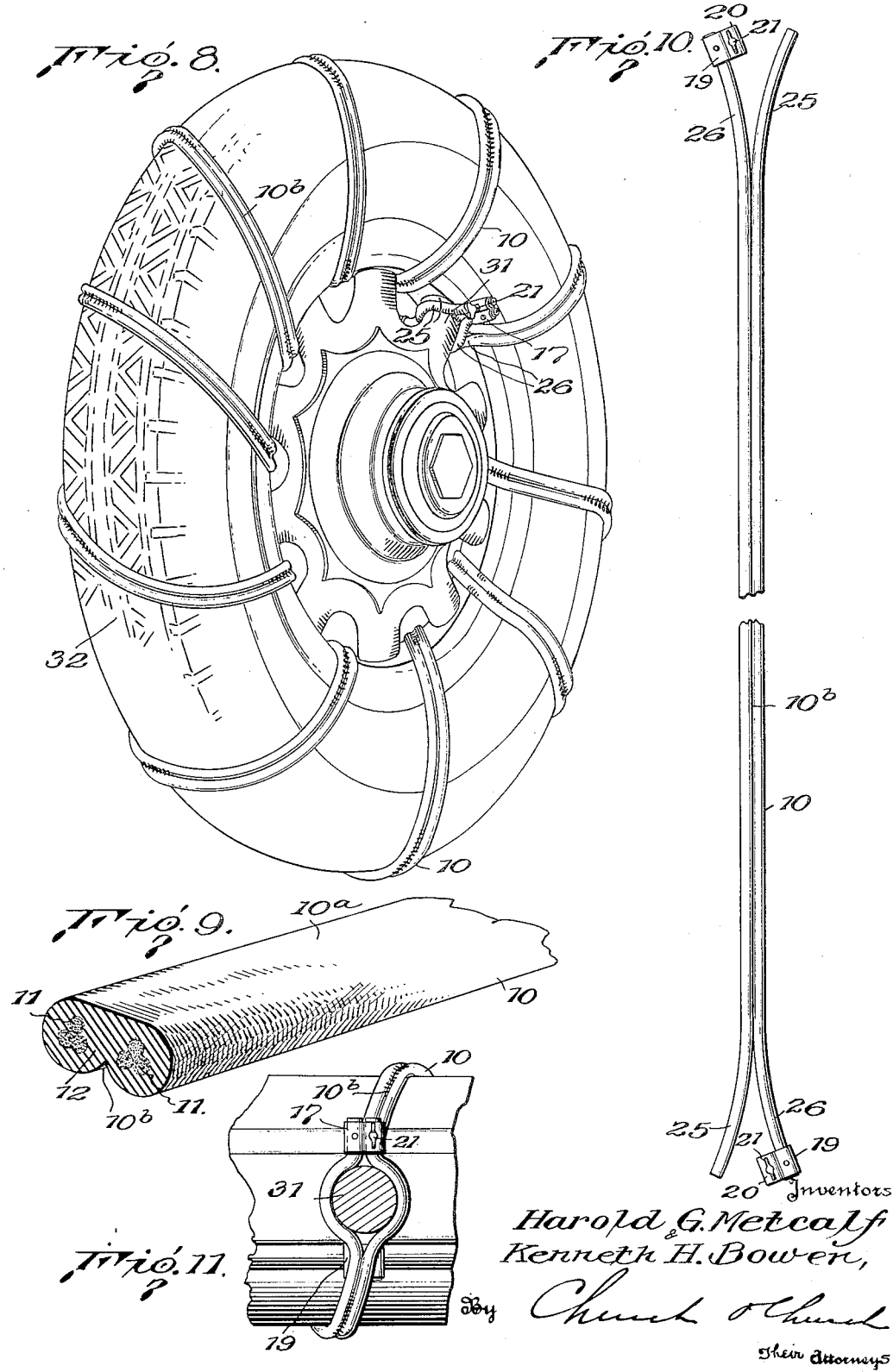

Patented Nov. 7, 1933

1,934,318

UNITED STATES PATENT OFFICE 1,934,318

ANTISKID DEVICE

Harold G. Metcalf and Kenneth H. Bowen, Auburn, N. Y., assignors to Columbian Rope Company, Auburn, N. Y., a corporation of New York Application April 18, 1932. Serial No. 605,962

5 Claims. (Cl. 152—14)

This invention relates to improvements in antiskid devices for vehicles, and has for its primary object the provision of a device which is simple and efficient in operation and which is economical to manufacture and which permits the device to be readily applied to and removed from the wheels of the vehicle.

Other objects contemplated comprise the production of an anti-skid device that will be noiseless when in use and that will not set up vibrations in the body of the vehicle.

A further object is the provision of a novel form of attaching means whereby the device may be easily and quickly applied to the wheel and held against creeping circumferentially of the wheel when in use. In this connection one species of the invention comprises a pair of the devices adapted to be placed on opposite wheels of a vehicle by being spiralled around the respective wheels in opposite directions whereby any tendency of the vehicle to skid will be confined to the normal direction of movement of the vehicle forwardly. In view of this, the fastening means used in such cases are designed to prevent misapplication of the two devices such as placing them on the wheels in spirals in the same direction.

Another object is the production of a skid device that will possess substantially maximum wearing properties but which, at the same time, will be of considerably less weight than the usual anti-skid devices. More specifically, the present devices are made with wearing surfaces of rubber, preferably provided with a fibrous core. They are also preferably circular in cross-section, especially in cases where they are to be used on comparatively light vehicles so that those portions contacting with the ground can partake of a rolling action, thereby reducing wear. In such cases, the core is made of a substantially untwisted body of fibers.

While it is preferred to form the anti-skid element circular in cross-section, the present invention also contemplates a member of non-circular cross-section especially adapted for use on heavier types of cars and trucks. This is accomplished by utilizing a plurality of laterally spaced core members, preferably two, whereby tendency of the anti-skid element to twist and form "hockles" is reduced to a minimum. In this particular form of the invention, the load is also distributed over a greater area on the anti-skid element. This prolongs the life of the element, particularly in that it tends to prevent pulverization and disintegration of the core members which are preferably of fiber, twisted or untwisted.

With these and other objects in view the invention consists in certain details of construction and combinations of parts all as will hereinafter be more fully described and the novel features thereof particularly pointed out in the appended claims.

In the accompanying drawings,

Figure 1 is a perspective view of a pair of the present devices applied to opposed wheels of a vehicle, the wheels being illustrated more or less in outline.

Fig. 2 is a sectional view transversely of one of the wheel spokes, illustrating the attachment of the present device.

Fig. 2$^a$ is a similar view showing another mode of attachment.

Fig. 3 is a side elevation illustrating a third mode of attaching the present device.

Fig. 4 is a perspective view illustrating the present invention embodied in a so-called mud "chain".

Fig. 5 is a view, partly broken away, illustrating one form of interior construction of the material used in the present device.

Fig. 6 is a similar view illustrating a different form of interior construction.

Fig. 7 illustrates a third form of core.

Fig. 8 is a perspective view of one wheel showing another embodiment of the invention in that the anti-skid element is formed with a plurality of core members.

Fig. 9 is a perspective view of a portion of the anti-skid element of Fig. 8, illustrating one form of dual core construction.

Fig. 10 is a plan view of the device shown in Fig. 8.

Fig. 11 is a section through a wheel spoke showing the attachment of the member illustrated in Fig. 8.

In the forms of the invention illustrated in Figs. 1 to 3, the anti-skid element 10 is applied to the wheel in spirals extending transversely of the wheel tread and with the spirals on the two opposed wheels laid in opposite directions. As a result, any skidding of the vehicle is confined to a line extending in the normal direction of travel of the machine and all lateral skidding eliminated.

Preferably, but not necessarily, the element 10 is formed with a core 11 of vegetable fiber. The important factors are that the element shall possess sufficient resiliency to eliminate noise and prevent setting up vibrations in the vehicle body and that it shall have a yielding, non-abrading exterior surface to prevent defacement of the wheel spokes. In the preferred embodiment illustrated in Fig. 5, the core 11 is composed of substantially untwisted fibers while in the form illustrated in Fig. 6 the core is formed of conventional three strand rope. In Fig. 7 the core is in the form of a yarn or ready. In each instance, the core may be impregnated with a solution of latex or the equivalent thereof which will effect a lubrication of the fibers after the rubber covering 12 is vulcanized. The core not only adds tensile strength to the anti-skid element but it also aids in maintaining the normal shape or cross-section of the element. That is, when the lengths of the element traversing the wheel tread engage the road surface, there is a tendency to twist the element but the core augments the untwisting thereof as each length of the element passes out of contact with the road surface.

Due to this construction of the element 10, the device can be applied and secured to the wheel by attaching means that lend to quick attachability and detachability. That is, the element is pliant so that it can be easily reversed upon itself and its resilient exterior surface is non-abrasive so that the device can be secured to a wheel spoke without liability of defacing the latter.

As illustrated, the element is provided with means whereby two lengths or portions thereto can be secured together side by side to form a loop in the element which directly engages around the spoke. This spoke encircling loop is indicated at 13 in the several views.

In Figs. 2 and 2a, one end of member 10 is secured thereto by a rivet 14 and attachment 15 which has two eyelets 16, 17 formed therein, one eyelet being located at each side of the member. Also fastened to said element by a rivet 18, but spaced longitudinally from attachment 15, is a second attachment 19 having one eyelet 20 therein. As shown in Fig. 2 the device may be applied to the wheel by placing the end of member 10 carrying attachment 15 against a spoke. The other end is then placed around the wheel and passed through eyelet 17 of attachment 15 and eyelet 20 of attachment 19. Said free end is then spiralled around the wheel and the free end finally secured in eyelet 16 of attachment 15. When the device is applied to a wheel, as shown in Fig. 2a, the end of the member 10 provided with attachments 15, 19 is placed beside a spoke and the element bent reversely upon itself and its other end passed through eyelet 20 of attachment 19 and eyelet 17 of attachment 15. The element 10 is drawn through said eyelets, thereby producing the spoke encircling loop 13 around the wheel spoke. The free end is then entwined spirally around the wheel as illustrated and finally secured in eyelet 16 of attachment 15. Any form of fastening means can be utilized for securing the element 10 in eyelets 16, 17, clamping screws 21 being illustrated in the present instance. As before mentioned either of these modes of attachment facilitates application of the device. At the same time, the device is so anchored to the spoke that slippage or creeping circumferentially of the wheel is prevented. It has also been pointed out that the two devices on opposed wheels are spiralled in opposite directions. In this connection, it will also be noted that the attachments 19 on each pair of devices is located on the opposite sides of the respective devices and, as a result, if an attempt is made to lay the spirals of both devices in the same direction, the free end of the element will not come into normal registry with eyelet 16 of attachment 15 but will have to be crossed over upon the first applied end in order to be brought into registry with said eyelet. This might be said to constitute a means for preventing misapplication of the devices in that the necessity of crossing the ends of element 10 will accentuate the fact that an erroneous application has been made.

In the device of Fig. 3 the free end of element 10 is secured to the hub of the wheel by a spring 22. In such structures as these, the attachments 15 and 19 are dispensed with and an eyelet 15a and a hook 20a provided at the ends so that the end carrying the hook 20a may be passed through the eyelet 15a to form the spoke encircling loop. The hook 20a is caught in loops 23 on the ends of spring 22.

In Fig. 4 there is illustrated a device usually termed a "mud chain" in that there is only a single reach of the anti-skid element 10 traversing the wheel tread. In this form of the invention, the eyelet 16 is omitted and the free end of the element projected through the eyelets 17 and 20 after the intermediate portion of the element has been placed around the wheel tread.

In each instance, the element 10 is formed with an exterior surface of rubber and preferably, but not necessarily, with the vegetable fiber core. This is important, not only from the standpoint of eliminating noise and vibration, but also for the further reasons that the device can be produced at considerably less cost and is much lighter in weight than the usual chains used in anti-skid devices. Neither the reduction in cost or weight detracts from the wear properties of the present construction. On the contrary, the yielding nature of element 10 adds to the life thereof.

It should also be mentioned that the use of a substantially inextensible core member eliminates stretching of element 10. The "lubrication" of the fibers, heretofore mentioned, is obtained by the use of latex which not only forms a bond between the fibers but also prevents any cross cutting of fiber on fiber the same as a lubricating oil eliminates friction between contacting metalic surfaces.

In the embodiment of the invention illustrated, in Figs. 8 to 11, the tread traversing element 10 has its ends attached directly to the wheel spokes 31 with its intermediate portion wrapped in spirals around the tread 32 of the wheel. To eliminate twisting of the tread traversing element on heavy automobiles or trucks, said element is provided with a substantially broad flat face 10a adapted to engage against the wheel tread. The opposite face is preferably formed with a longitudinally extending depression 10b.

To facilitate production of this advantageous cross-section two fibrous core members 11, each of which may be of the type shown in Figs. 5 to 7, are utilized. As illustrated, these two core members are spaced laterally of the element 10 and are embedded in the rubber 12 constituting the wearing or exterior surface. The use of the dual core members also lends to the easy attachment of member 10. That is, the ends of the element may be bifurcated, on a line between the two cores, to form the bifurcations 25, 26 at the opposite ends and a fastening member, which may be in the form of the attachment 19 formed with the eyelet 20 and clamping screw 21, is riveted or otherwise permanently secured to one bifurcation at each end of element 10. With this construction, the bifurcations at each end may be placed around a spoke or spokes and their free ends fastened together as shown in Fig. 11, thereby securely attaching the device on the wheel.

What we claim is:

1. An anti-skid member adapted to be applied transversely to the tread of a vehicle wheel, said member being of pliant construction, one end of said member being turned reversely upon itself to form a spoke encircling loop, and means for attaching the opposite end of said member to the reversely turned end.

2. An anti-skid member adapted to be applied transversely to the tread of a vehicle wheel, said member being composed of a pliant vegetable fiber core and a rubber sheathing, one end of said member being turned reversely upon itself to form a spoke encircling loop, and means for securing the other end of said member to the reversely turned end.

3. An anti-skid member of pliant material, longitudinally spaced eyelets adjacent one end of said member through which the opposite end of the member may be projected to form a spoke encircling loop, and means for detachably securing said member in said eyelets.

4. An anti-skid member of pliant material adapted to be applied transversely of the tread of a vehicle wheel, holding means carried by said member at longitudinally spaced points thereof, and means for securing a portion of the member between said holding means to form a spoke encircling loop in said member.

5. An anti-skid member of pliant material adapted to be applied transversely of the tread of a vehicle wheel, two longitudinally spaced eyelets at one side of said member adjacent one end thereof through which the opposite end of the member may be inserted to form a spoke encircling loop, and a third eyelet at the opposite side of the first mentioned end in which said opposite end of the member may be detachably secured.

HAROLD G. METCALF.
KENNETH H. BOWEN.